(12) United States Patent
Mutschler et al.

(10) Patent No.: US 9,216,347 B2
(45) Date of Patent: Dec. 22, 2015

(54) PORTABLE DEVICE, VIRTUAL REALITY SYSTEM AND METHOD

(71) Applicants: Christopher Mutschler, Erlangen (DE); Stephan Otto, Heroldsberg (DE); Nicolas Witt, Nuernberg (DE)

(72) Inventors: Christopher Mutschler, Erlangen (DE); Stephan Otto, Heroldsberg (DE); Nicolas Witt, Nuernberg (DE)

(73) Assignee: FRAUNHOFER-GESELLSCHAFT ZUR FOERDERUNG DER ANDEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 14/245,790

(22) Filed: Apr. 4, 2014

(65) Prior Publication Data

US 2014/0221090 A1    Aug. 7, 2014

Related U.S. Application Data

(63) Continuation of application No. PCT/EP2012/069624, filed on Oct. 4, 2012.

(30) Foreign Application Priority Data

Oct. 5, 2011    (EP) .................................... 11183970

(51) Int. Cl.
*A63F 13/40* (2014.01)
*A63F 13/98* (2014.01)
*G06F 3/01* (2006.01)
*G02B 27/01* (2006.01)
*G02B 27/00* (2006.01)
*A63F 13/30* (2014.01)
*G01C 21/20* (2006.01)
*G06F 3/147* (2006.01)

(52) U.S. Cl.
CPC ................. *A63F 13/02* (2013.01); *A63F 13/12* (2013.01); *G01C 21/206* (2013.01); *G02B* (Continued)

(58) Field of Classification Search
CPC .................... A63F 13/5258; A63F 2300/6661; A63F 2300/6669; A63F 2300/8082; A63F 13/02
USPC ...................................... 463/31–34
See application file for complete search history.

(56) References Cited

U.S. PATENT DOCUMENTS

2002/0057280 A1   5/2002   Mabaro et al.
2006/0017654 A1   1/2006   Romo
(Continued)

FOREIGN PATENT DOCUMENTS

GB       2376397 A       12/2002
JP      2002048562 A      2/2002
(Continued)

OTHER PUBLICATIONS

Office action dated Jul. 7, 2015 for related Japanese Appl. No. 2014-533895.

*Primary Examiner* — Allen Chan
(74) *Attorney, Agent, or Firm* — Allen J. Moss; Squire Patton Boggs (US) LLP (57) ABSTRACT

A portable device includes a viewing direction sensor configured to determine the viewing direction of a user of the portable device in the real world and a position determiner configured to determine a position of the user in the real world. Furthermore, the portable device includes a processing unit configured to generate—based on the viewing direction of the user and the position of the user in the real world—a virtual world in which a change of the viewing direction in a 3D coordinate system of the real world leads to a change of the viewing direction in a 3D coordinate system of the virtual world. The portable device further includes a display configured to display the generated virtual world to the user while blocking a view of the real world.

18 Claims, 5 Drawing Sheets

(52) U.S. Cl.
CPC .. 27/0093 (2013.01); *G02B 27/017* (2013.01); *G06F 3/011* (2013.01); *A63F 2300/105* (2013.01); *A63F 2300/204* (2013.01); *A63F 2300/205* (2013.01); *A63F 2300/6615* (2013.01); *A63F 2300/69* (2013.01); *A63F 2300/8082* (2013.01); *G02B 2027/014* (2013.01); *G02B 2027/0134* (2013.01); *G06F 3/147* (2013.01)

(56) References Cited

U.S. PATENT DOCUMENTS

| | | | |
|---|---|---|---|
| 2007/0038944 A1* | 2/2007 | Carignano et al. | 715/757 |
| 2008/0111832 A1 | 5/2008 | Emam et al. | |
| 2009/0111670 A1 | 4/2009 | Williams | |
| 2009/0221374 A1* | 9/2009 | Yen et al. | 463/42 |
| 2011/0216002 A1 | 9/2011 | Weising et al. | |

FOREIGN PATENT DOCUMENTS

| | | |
|---|---|---|
| JP | 2002163670 | 6/2002 |
| JP | 2003305276 A | 10/2003 |
| JP | 2006285833 A | 10/2006 |
| JP | 2008108246 | 5/2008 |
| JP | 2011059069 A | 3/2011 |
| JP | 2011128220 | 6/2011 |
| JP | 2011170682 A | 9/2011 |

* cited by examiner

PORTABLE DEVICE, VIRTUAL REALITY SYSTEM AND METHOD

CROSS-REFERENCE TO RELATED APPLICATIONS

This application is a continuation of copending International Application No. PCT/EP2012/069624, filed Oct. 4, 2012, which is incorporated herein by reference in its entirety, and additionally claims priority from European Application No. EP 11183970.0, filed Oct. 5, 2011, which is also incorporated herein by reference in its entirety.

TECHNICAL FIELD

Embodiments of the systems and methods described herein relate to a portable device. Further embodiments of the systems and methods described herein relate to a virtual reality system.

BACKGROUND OF THE INVENTION

Until now, it is not possible to implement first person games in which a user can act and move in a virtual environment like being in reality because of two main problems. First, it was not possible to determine the viewing direction of an object accurately enough. Second, localization of objects cannot be performed precisely in a manner of a couple of centimeters with known systems. Additionally, processing times have to be at a minimum in order to convey a real interaction with the system. Third, current approaches apply more or less restricted hardware setups like, for example, the so-called 2D Cyber Walk platform from treadmill or simulators known from aeronautic or automotive.

This Cyber Walk platform is very inflexible as ground controls for the floor and massive electronic devices to the head have to be installed. Furthermore, interaction with other users would necessitate such a setup for any person that is contributing.

SUMMARY

According to an embodiment, a portable device may have: a viewing direction sensor configured to determine the viewing direction of a user of the portable device in the real world; a position determiner configured to determine a position of the user in the real world; a processing unit configured to generate—based on the viewing direction of the user and the position of the user in the real world—a virtual world in which a change of the viewing direction in a 3D coordinate system of the real world leads to a change of the viewing direction in a 3D coordinate system of the virtual world; and a display configured to display the generated virtual world to the user while blocking a view of the real world; wherein the processing unit is configured to generate virtual objects in the virtual world at positions in the 3D coordinate system of the virtual world; wherein the processing unit is configured to change a level of detail or a size of the virtual objects in response to a change of a precision of the determined position of the user in the real world; and wherein the processing unit is configured to choose the level of detail or the size of the virtual objects in dependence on the precision of a currently used locating algorithm for determining the position of the user.

According to another embodiment, a virtual reality system may have: an inventive portable device; and a terrestrial communication unit, which is arranged external to the portable device; and wherein the position determiner of the portable device is configured to determine the position of the user in the real world based on a wireless communication signal received from the terrestrial communication unit.

According to another embodiment, a method may have the steps of: determining a viewing direction of a user in the real world; determining a position of the user in the real world; generating—based on the viewing direction of the user and the position of the user in the real world—a virtual world in which a change of the viewing direction in a 3D coordinate system of the real world leads to a change of the viewing direction in a 3D coordinate system of the virtual world; and displaying the generated virtual world to the user while blocking a view of the real world; generating virtual objects in the virtual world at positions in the 3D coordinate system of the virtual world; and changing a level of detail or a size of the virtual objects in response to a change of a precision of the determined position of the user in the real world, wherein the level of detail or the size of the virtual objects is chosen in dependence on the precision of a currently used locating algorithm for determining the position of the user.

Another embodiment may have a non transitory storage medium having stored there on a computer program having a program code for performing, when running on a computer, an inventive method.

Embodiments of the present invention create a portable device comprising a viewing direction sensor configured to determine the viewing direction of a user of the portable device in the real world. Furthermore, the portable device comprises a position determiner configured to determine a position of the user in the real world. Furthermore, the portable device comprises a processing unit configured to generate—based on the viewing direction of the user and the position of the user in the real world—a virtual world in which a change of the viewing direction in a 3D coordinate system of the real world leads to a change of the viewing direction in a 3D coordinate system of the virtual world. Furthermore, the portable device comprises a display configured to display the generated virtual world to the user while blocking a view of the real world.

It is an idea of embodiments of the systems and methods described herein that the portable device can convey the impression to the user of residing in a completely virtual world when different sensor information (like a position and a viewing direction of the user in the real world) are combined to create a virtual world and, furthermore, when the virtual world is displayed to the user while a view of the real world is blocked. Hence, a movement of the user in the real world can be detected by the portable device and can be ported (or transferred) to a movement of the user in the virtual world. By blocking the view of the real world of the user the portable device can convey the impression that the user resides in a completely virtual world.

Hence, the portable device enables simulating a temperature, weather and time independent virtual reality or virtual world, in which the user can move freely and with which the user can interact. Furthermore, the portable device enables an integration of more than one user in one instance of a virtual reality system comprising a plurality of such portable devices. As an example, each user may carry his own portable device, which may communicate directly with the other portable devices or by means of an external communication unit.

According to some embodiments, the portable device may be a handheld device which can be carried around by the user in his hand. The display of the portable device may be together in one housing with the processing unit, the position determiner and the viewing direction sensor, for example, such that the user only carries one device in hand, which also comprises the display. Furthermore, the display may be in a different housing than the viewing direction sensor, the position determiner and the processing unit. For example, the processing unit may be connected to the display by means of a wireless communication interface or a wired communication interface. As an example, the portable device may comprise glasses, comprising the display.

According to further embodiments, the complete portable device may be integrated in glasses, for example such that the user does not have to carry the portable device in his hand, but can wear it on his head.

As mentioned before, the display is configured to display the generated virtual world to the user by blocking a view of the real world. According to some embodiments, the display may block the view of the real world through the display, which means the display only shows the virtual world and not the real world. This is significantly different from augmented reality systems, in which virtual elements are placed virtually in the view of the real world.

In other words, the user may view the real world only when not staring at the display.

According to further embodiments, for example in embodiments in which the display is comprised in glasses, the display and the glasses may be built such that a view of the real world of a user wearing the glasses is blocked even when the user is not staring directly at the display.

It is an advantage of the present invention that embodiments provide a system or a portable device that provides a complete virtually created environment based on real and accurate sensor data (for example, from the viewing direction sensor and the position determiner). This enables that the user acts physically in the real environment but sees and interacts with the virtual environment. The user can act and move in this virtual environment like being in reality. The user can therefore play games (which he recently played on his workstation at home) by himself, acting and moving on his own without controlling an avatar on a screen.

BRIEF DESCRIPTION OF THE DRAWINGS

Embodiments of the systems and methods described herein will be detailed subsequently referring to the appended drawings, in which.

DETAILED DESCRIPTION OF THE INVENTION

Before embodiments of the systems and methods described herein are described in detail using the accompanying figures, it is to be pointed out that the same elements or elements having the same function are provided with the same reference numbers and that a repeated description of elements provided with the same reference numbers is omitted. Hence, descriptions provided for elements having the same reference numbers are mutually exchangeable.

Figure 1:
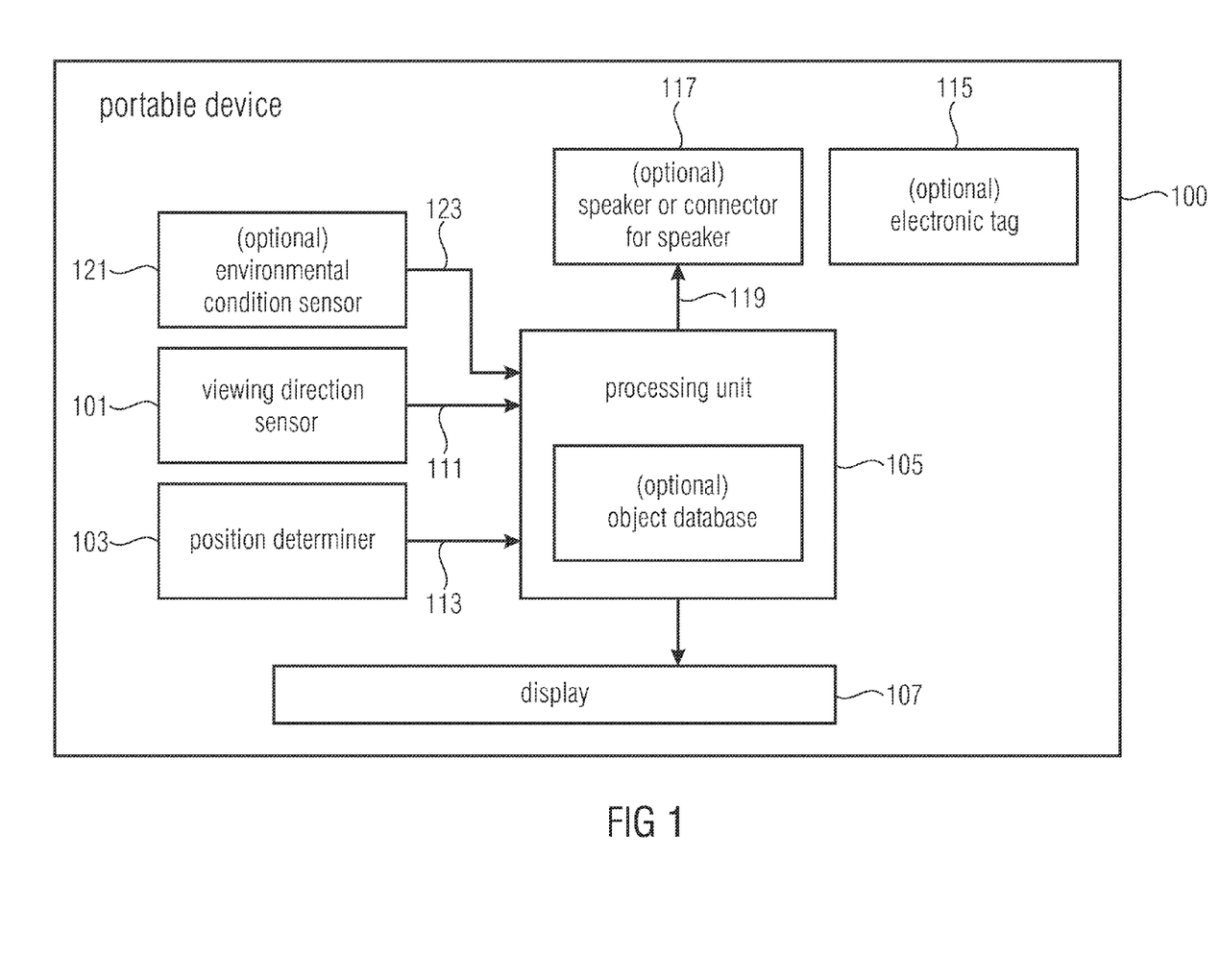
FIG. 1 shows a block diagram of a portable device according to an embodiment of the systems and methods described herein.

FIG. 1 shows a block diagram of a portable device 100 according to an embodiment of the systems and methods described herein. The portable device 100 comprises a viewing direction sensor 101, a position determiner 103, a processing unit 105 and a display 107. The viewing direction sensor 101 is configured to determine a viewing direction 111 of a user of the portable device 100 in the real world.

The position determiner 103 is configured to determine a position 113 of the user in the real world. The processing unit 105 is configured to generate—based on the determined viewing direction 111 of the user and the determined position 113 of the user in the real world—a virtual world in which a change of the viewing direction 111 in a 3D coordinate system of the real world leads to a change of the viewing direction in a 3D coordinate system of the virtual world.

Furthermore, the display is configured to display the generated virtual world to the user while blocking a view of the real world (for example, through the display 107).

As described in the introductory part of this application, the portable device 100 is capable of providing a complete virtually created environment or world based on real and accurate sensor data (from the viewing direction sensor 101 and the position determiner 103), such that the user can act physically in the real environment or world but sees or interacts with the virtual environment or world. The user can act or move in this virtual environment or world like being in reality. The user can therefore play games (which he recently played on this workstation at home) by himself, acting and moving on his own without controller an avatar on a screen.

It has been found that a viewing direction can be derived accurately enough by microelectromechanical systems (MEMS), in this case mainly gyroscopes. Such gyroscopes can be used to determine the angular change of the orientation. The sensor information (from the gyroscopes) combined with a sluggish magnetometer (it is sluggish due to its nature) and inertial sensors, the viewing direction sensor 101 enables deriving the viewing direction 111 very precisely, even with fast movements or direction changes.

In other words, the viewing direction sensor 101 may comprise one type of sensor or a plurality of different types of sensors, based on which the viewing direction sensor determines the viewing direction 111. As an example, the viewing direction sensor 101 may comprise a gyroscope sensor, an accelerometer sensor and/or a magnetometer sensor for deriving movements of the user in the real world and may be configured to derive the viewing direction 111 based on gyroscope sensor data, accelerometer sensor data and/or magnetometer sensor data. This enables a very precise determination of the viewing direction 111 of the user in the real world. As described above, the processing unit 105 is configured to generate the virtual world such that a change of the viewing direction in the 3D coordinate system of the real world leads to a change of the viewing direction in the 3D coordinate system of the virtual world. Hence, it can be seen that the viewing direction sensor 111 determines the viewing direction of the user in a three-dimensional fashion which can then be ported by the processing unit 105 to the three-dimensional virtual world. In other words, the viewing direction sensor 111 is not only capable of determining a rotation of the user in a horizontal direction, but is also configured to determine a change of the viewing direction 111 in a vertical direction. Accordingly, the processing unit 105 is configured to port the change of the viewing direction 111 in the horizontal direction and in the vertical direction to the generated virtual world, for example, such that a change of the viewing direction 111 in the horizontal direction in the real world leads to a change (e.g. an aligned change) of the viewing direction in a horizontal direction in the virtual world and a change of the viewing direction 111 in a vertical direction in the real world leads to a change (e.g. an aligned change) of the viewing direction in a vertical direction in the virtual world. Or in other words, according to some embodiments, the change of the viewing direction of the user in the virtual world may be aligned or at least proportional to the viewing direction 111 of the user in the real world.

Hence, the user can interact with the virtual world as in the real world by changing his viewing direction in a three-dimensional fashion resulting in change of the viewing direction in a three-dimensional fashion in the virtual world.

Furthermore, the processing unit 105 may be configured to generate the virtual world such that a change of the position of the user in the 3D coordinate system of the real world leads to a change of the position of the user in the 3D coordinate system of the virtual world. In other words, upon a change of the position 113 of the user in the real world (e.g. determined by the position determiner 103) the processing unit 105 may simulate a change of the position of the user in the virtual world.

According to some embodiments the change of the position of the user in the virtual world may be aligned or at least proportional to a change of the position 113 of the user in the real world.

In other words, the processing unit 105 is configured to combine the sensor data from the viewing direction sensor 101 with position data from the position determiner 103 to derive the position 113 of the portable device 100 (which may be a handheld device), and therefore of the user, and the viewing direction 111 at that point precisely.

According to some embodiments of the systems and methods described herein the position determiner 103 be a real time location system (RTLS) sensor which enables a detection of the position 113 of the user with a high precision, especially when compared to GPS systems. Furthermore, the use of such RTLS systems enables a use of the portable device 100 in areas with no GPS covering (e.g. in houses or other areas with no contact to GPS satellites).

According to some embodiments a measurement error for the locating systems (e.g. for the determined position 113) is tolerable for a few centimeters.

Figure 4:
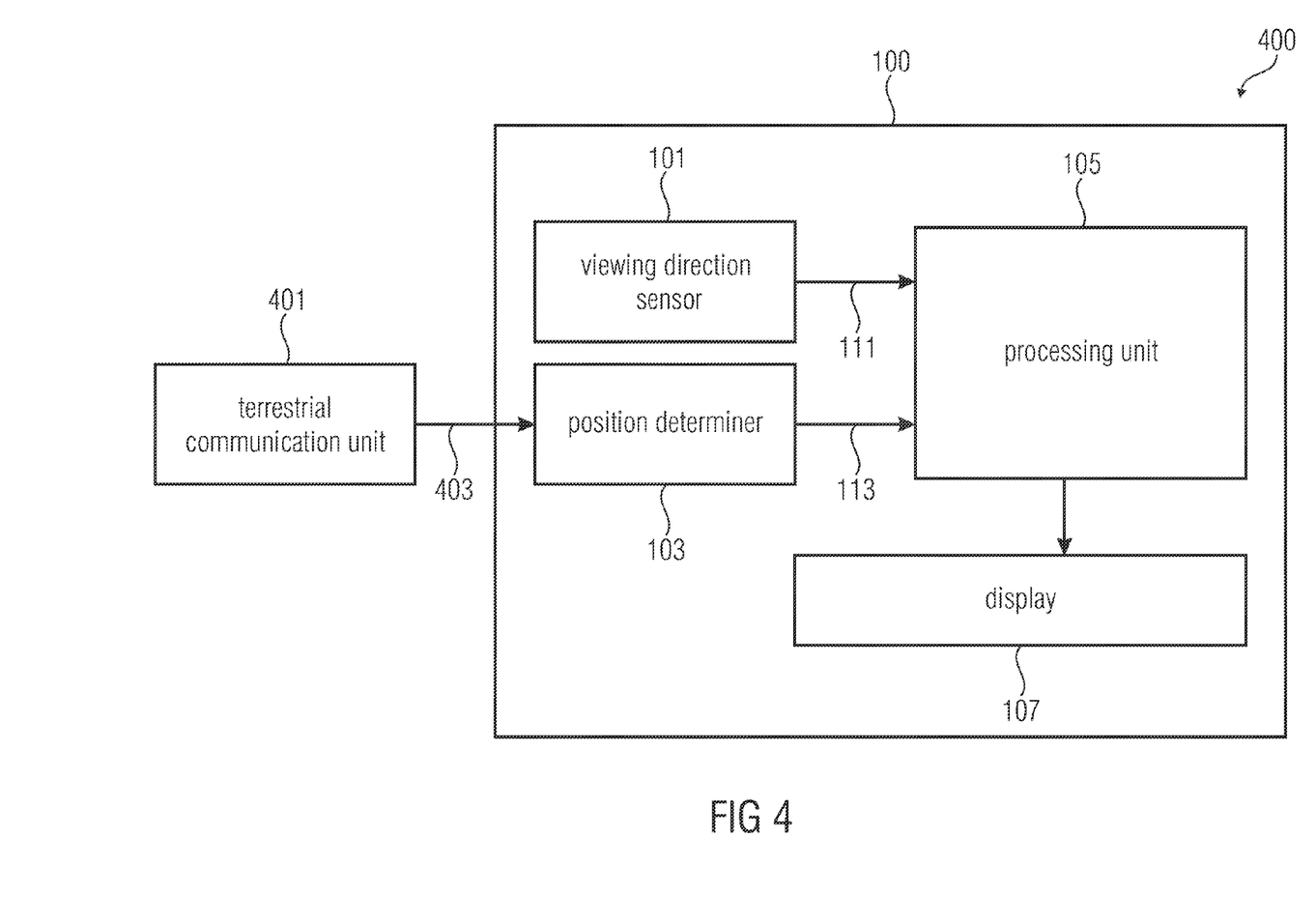
FIG. 4 shows a block diagram of a virtual reality system according to a further embodiment of the systems and methods described herein.

According to some embodiments, e.g. as described in conjunction with a virtual reality system according to FIG. 4, a movement area (which is the area in which such a virtual reality system is able to perform a locating with transmitters) can be surveyed such that the actual position 113 of the portable device 100 can be overlaid in the virtual environment or virtual world. By wearing the portable device 100 (or only the motion sensors, such as the viewing direction sensor 101 and the position determiner 103) directly on the head, the person can rotate his hand and look around in the virtual reality or the virtual world as being in the real world. As described before, the position determiner 103 may be based on a real time locating system. As an example, the position determiner 103 may be configured to communication with an external (e.g. terrestrial) communication unit which surveys the movement area for the portable device 100 and transmits the position 113 of the portable device 100 to the position determiner 103. To determine the position 113 of the portable device 100 the portable device 100 may comprise an electronic (locatable) tag 115 (or transponder), a position 113 of which can be determined by the external communication unit. By the localizable electronic tag 115 (ideally also mounted on the head) the person or the user can move and the portable device 100 can render the image from the right position in the virtual world or environment on the display 107.

To summarize, the portable device 100 may comprise the electronic tag 115 which is located by the external communication unit and the position determiner 103 is configured to determine the position 113 of the user in the real world based on a communication signal received from the external communication unit. As an example, the external communication unit may perform a time difference of arrival (TDoA), a time of arrival (ToA), a direction of arrival (DoA) or an RSS measured (RSS—Received Signal Strength) and may determine based on or more of these measurements the position 113 of the portable device 100 and may transmit the position 113 as the communication signal to the position determiner 103.

Hence, in some embodiments of the systems and methods described herein the position determiner 103 can be implemented as a communication interface or unit, such as a WLAN interface (WLAN—wireless local area network).

According to further embodiments, the position determiner may be a mobile communication interface like, for example, an LTE (Long Term Evolution), UMTS (Unified Mobile Telecommunication Standard), or an GSM (Global System for Mobile Communication) interface.

According to some embodiments of the systems and methods described herein, a functionality of the electronic tag 115 may be independent from a functionality of the position determiner 103. As an example, the electronic tag 115 may be a so-called passive tag, which does not have its own voltage supply, such as an passive RFID tag. In other words, the electronic tag 115 may be electronically decoupled from the other components of the portable device 100 and may even be placed in a different housing than the other components of the portable device 100.

According to further embodiments, the electronic tag 115 may be an active tag having its own voltage supply or sharing the voltage supply with the rest of the components of the portable device 100. Even in this case the functionality of the electronic tag 115 may be independent of the functionality of the position determiner 103, e.g. the electronic tag 115 and the position determiner 103 may not be capable of communicating with each other, as they are both only capable of communicating with the external communication unit. In a very easy embodiment of the systems and methods described herein the electronic tag 115 may be a so-called read only transponder which sends a serial number upon reception of a valid wakeup signal from the external communication unit. The external communication unit may receive the serial number and may perform the locating measurements as described before, to determine the position 113 of the electronic tag 115 and therefore of the user and may transmit this position 113 to the position determiner 103 of the portable device 100.

As an example, all components of the portable device 100 besides the electronic tag 115 (such as the viewing direction sensor 101, the position determiner 103, the display 107 and the processing unit 105) may be part of a mobile phone (e.g. a so-called smart phone) while the electronic tag 115 is (externally) mounted to the mobile phone. In other words, the electronic tag 115 (or the "position transmitter") is separated from the rest of the portable device 100. This is an advantage of an easier and cheaper implementation. In such a mobile phone the position determiner 103 may be implemented using the WLAN interface or the UMTS interface of the mobile phone for receiving the position information and other data. In the case of using an WLAN and an RTLS system for determining the position 113 of the user, it should be pointed out that in this case some embodiments are restricted to 5 GHz WLAN, since the 2.4 GHz standard collides with the RTLS system. Furthermore, the use of UMTS for receiving the position information may lead to a high delay up to 200 ms.

According to further embodiments, the display 107 may be an external display which is connected to the processing unit 105, e.g. by use of a cable. In other words, the display 107 may not necessarily be the normal display of the mobile phone but may be an external display, e.g. comprising glasses.

Furthermore, the display 107 may comprise 3D virtual reality glasses which are connectable to the processing unit 105, such that the portable device 100 can render two images and display them on the glasses.

According to further embodiments, the portable device 100 may comprise a speaker 117 or a connector 117 for a speaker. The processing unit 105 may be configured to provide an audio signal 119 to the speaker 117 or the connector 117 for the speaker, e.g. depending on the viewing direction and/or the position of the user in the real world or the virtual world. In conjunction with the display 107, depending on the viewing direction 111 and the position 113 of the user in the real world, audio visual effects and be performed very realistically. As an example, headphones may be connected to the connector 117 at the portable device 100. Therefore, the portable device 100 or the handheld can generate audio effects and transmit it to the ears like in reality. For instance, the sound of waterfalls can be generated on the handheld (or can be played from a memory) in a modulated way so that the ear that is directed towards the (virtual) waterfall receives the higher amplitude of sound than the other ear.

To summarize, the processing unit 105 may be configured to generate sounds at the speaker 117 or at a speaker connected to the connector 117 based on the viewing direction 111 and/or the position 113 of the user in the real world.

According to further embodiments, the portable device 100 may comprise an environmental condition sensor 121 configured to determine an environmental condition 123 in the real world. The processing unit 105 may be further configured to generate the virtual world based on the environmental condition 123 such that a change of the environmental condition 123 in the real world leads to a change in the generated virtual world. As an example, the environmental condition sensor 121 may be a light and/or temperature sensor. By using such light and/or temperature sensor of the portable device 100 the virtual reality or virtual world can also be intended to render a reality that first has the current daytime and solar radiation. So, for example, if the current temperature in the real world is very hot, the virtual reality can be rendered accordingly to this condition.

According to further embodiments, the determined environmental condition 123 can be an air humidity, an air pressure, a temperature, a light condition (such as a brightness or darkness), an acceleration, a magnetic field (the strength of a magnetic field), a relative orientation (e.g. determined by a gyroscope), a wind strength, an odour, sounds or a 360° distance measure.

In other words, the environmental condition sensor 121 can be an air humidity sensor, an air pressure sensor, a temperature sensor, a light sensor, an acceleration sensor, a magnetic field sensor, a relative orientation sensor (e.g. a gyroscope), a wind strength sensor, an odour sensor, a sound sensor (such as one or more microphone(s)) or a 360° distance sensor.

According to some embodiments, the determined environmental condition 123 may not be viewable for a user in the real world, such as a temperature or air humidity in the real world. The processing unit 105 may be configured to graphically visualize the determined environmental condition 123 in the generated virtual world. As an example, if a temperature in the real world is very high and a humidity is very low, the processing unit 105 may graphically visualize this environmental condition 123 by simulating a desert in which the user moves virtually. As another example, in the case of a high temperature and a high air humidity, the processing unit 105 may graphically visualize this determined environmental condition 123 by simulating a rainforest in which the user moves virtually.

According to further embodiments, the processing unit 105 may be configured to generate virtual objects in the virtual world at positions in the 3D coordinate system of the virtual world which correspond to positions in the 3D coordinate system of the real world at which the objects in the real world are located. This functionality shall be explained in the following using a short application example of the portable device 100.

The portable device 100 may be used, for example, in gaming applications, but also in security critical applications. As an example, in the case of a fire emergency a firefighter may be equipped with the portable device 100 for navigating in a burning building. The portable device 100 (e.g. the processing unit 105) may be configured to create a complete virtual replication of the burning building, such that the firefighter can move in the real world in the building while seeing the virtual world through its display 107. The advantage of this is that even if due to the fire in the building the visibility is very bad, the firefighter can still navigate in the building having the support of the portable device 100. Objects, e.g. doors or stairs, in the real world are simulated by the processing unit 105 in the virtual world. In other words, the processing unit 105 generates the virtual objects in the virtual world, e.g. virtual stairs or virtual doors, in the 3D coordinate system of the virtual building at positions in the 3D coordinate system of the virtual world which correspond to (their real positions) in the 3D coordinate system of the real world (the real building).

In other words, the processing unit 105 may be configured to generate—based on an object database—the virtual world as a virtual reproduction of the real world in which the user acts.

As an example, the real objects and their positions in the 3D coordinate system of the real world may be stored in an object database which can be placed in the portable device 100 or in the above described external communication unit, e.g. in a centralized server. The processing unit 105 may be configured to generate the virtual objects based on the object database. Furthermore, as described before the processing unit 105 may be configured to visualize a determined environmental condition 123 in the generated virtual world. In this example, the processing unit 105 may simulate hot areas, for example behind closed doors, with different colors, e.g. simulating a red door, such that the firefighter knows that behind this closed door a high temperature source is located.

In this described application, typically the real objects in the real world are replicated by the processing unit 105 with virtual objects in the virtual world, which are similar or equal to the real objects in the real world.

According to further embodiments, for example in a gaming application, the processing unit 105 may be configured to replace a real object in the real world with a virtual object in the virtual world, such that the virtual object in the virtual world which replaces the real object in the real world leads to a similar user behavior as the real object in the real world.

Figure 2:
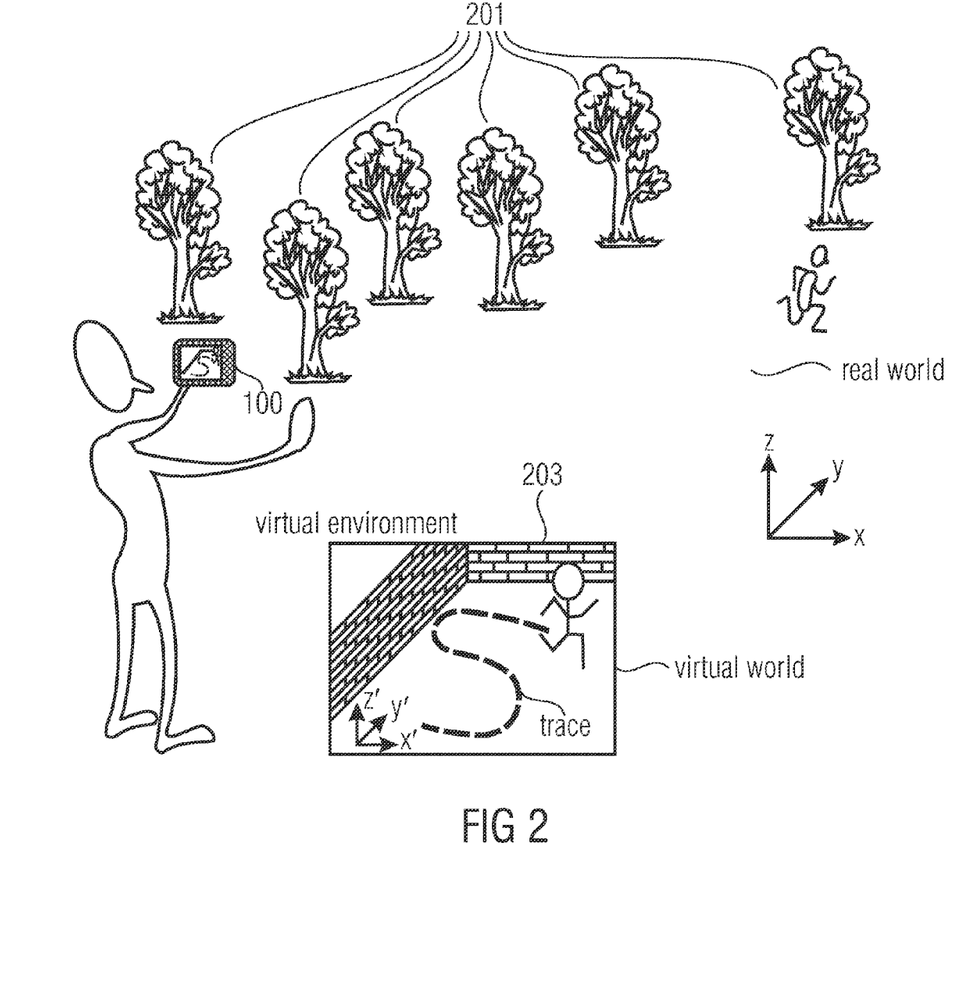
FIG. 2 shows an illustration of an example for an application of the portable device from FIG. 1.

Such an example is shown in FIG. 2.

The example shown in FIG. 2 may be a gaming application. In this example the user is moving in a 3D coordinate system of the real world. The 3D coordinate system of the real world may be described by a three-dimensional vector having an x-component, a y-component and a z-component, which are all orthogonal to each other. Hence, the position and the viewing direction of the user in the real world can be described by a three-dimensional xyz vector. The 3D coordinate system of the virtual world may be described by a three-dimensional vector having an x'-component, a y'-component and a z'-component, which are all orthogonal to each other. Hence, the position and the viewing direction of the user in the virtual world can be described by a three-dimensional x'y'z' vector.

As described above, changes of the viewing direction and/or the position of the user in the virtual world may be aligned to changes of the viewing direction and/or the position of the user in the real world.

In the example shown in FIG. 2 trees are shown, which represent real objects 201. These real objects 201 can be replaced by the processing unit 105 of the portable device 100 with one or more virtual object(s) 203 which lead(s) to a similar user behavior as the real objects 201. In the example shown in FIG. 2 the processing unit 105 replaces the real trees 201 with a virtual wall 203. This virtual wall 203 leads to a similar user behavior like the real trees 201, e.g. a user would avoid running into a tree and would also avoid running into a wall. The real objects 201 (in the example of FIG. 2, the trees 201) may be stored in an object database together with the locations in the real world, such that the processing unit 105 may generate the virtual objects (e.g. the wall 203) based on the object database. Furthermore, the processing unit 105 may be configured to generate the virtual world in accordance with a game the user plays, such that a way the processing unit 105 generates the virtual world is different for different games the user plays or for different game situations of the game the user plays, while the real world in which the user acts stays the same. As an example, in another game situation or in another game the real trees 201 may be replaced by other virtual objects, for example by an abyss, a fence or a steep rock which leads to a similar user behavior as the real trees 201.

Hence, the processing unit 105 may adapt the generation of the virtual world in dependence on a game or a game situation, although the real world stays the same. Hence, the user may, during two different games or different game situations, move and act in the same area of the real world, but may have a completely different virtual experience due to the fact that the processing unit 105 generates a completely different virtual world.

According to further embodiments, the processing unit 105 may be configured to change a level of detail or a size of the virtual objects in response to a change of a precision of the determined position 113 and/or viewing direction 111 of the user in the real world. As an example, the processing unit 105 may choose the level of detail or the size of the virtual objects in dependence on a currently used locating algorithm for determining the position 113 of the user. As an example, when the position 113 of the user is determined based on a GPS location system or algorithm the level of detail of the virtual objects may be chosen lower than when a RTLS system or algorithm is used to determine the position 113 of the user, as RTLS is typically much more precise than GPS. As an example, in the presented firefighter example, a precision of less than 1 m would be sufficient, while in digital interactive games a higher precision of smaller than 10 cm may be necessitated. To summarize, the virtual reality or virtual world may be dependent on the precision of the locating algorithm or system (i.e. the less precise the locating system is, the less precise the elements in the virtual world should be).

As an example, the processing unit 105 can be configured to, upon on a decrease of the precision of the determined position 113 of the user in the real world, increase a size of the virtual objects 203 or decrease a level of detail of the virtual objects 203. As a further example, the processing unit 105 can be configured to, upon on an increase of the precision of the determined position 113 of the user in the real world, decrease a size of the virtual objects 203 or increase a level of detail of the virtual objects 203. Hence it can be achieved that on the one hand a realistic as possible virtual world can be generated on and on the other hand it can be ensured that the user does not accidentally collide with objects due to an imprecise determination of its position.

A further aspect of embodiments of the systems and methods described herein is the real-time aspect, i.e. changes of the viewing direction have to be determined fast enough such that a human being does not feel irritated. This means that on the one hand the hardware or the sensors have to be precise and fast enough, and on the other hand that the rendering of the virtual world has to happen fast enough. According to some embodiments a maximum delay of 40 ms may be tolerable (which corresponds to a delay of 1 picture at 25 pictures per second). According to further embodiments, the tolerable delay may be 20 ms. The positioning data can be more delayed since a delay of the position data does not influence the virtual impression as much as a delay of the viewing direction data.

Furthermore, as described before, the portable device 100 may be configured to determine its position and therefore the user's position 113 in the real world on its own, for example based on a GPS signal or with the help of an external (e.g. terrestrial) communication device, which determines the position of the portable device 100, e.g. based on the electronic tag 115. In this latter scenario the portable device 100 is located by the infrastructure (e.g. by the antennas of the external communication unit) and the determined position 113 is transmitted to the portable device 100 by means of a wireless communication.

According to further embodiments, to further improve realism, force feedback devices can be used to convey physical information. Such physics could be rain, earthquakes or physical interaction with computer players, e.g. controlled by artificial intelligence.

In other words, the processing unit 105 may be further configured to generate force feedback data which is provided to suitable force feedback devices (e.g. mounted at the user).

According to some embodiments of the systems and methods described herein, the viewing direction sensor 101 may comprise different sensor units, such as: a gyroscope sensor unit, an accelerometer sensor unit and/or a magnetometer sensor unit. The viewing direction sensor 101 may determine the viewing direction 111 of the user in the real world based on sensor data from these different sensor units.

Figure 3:
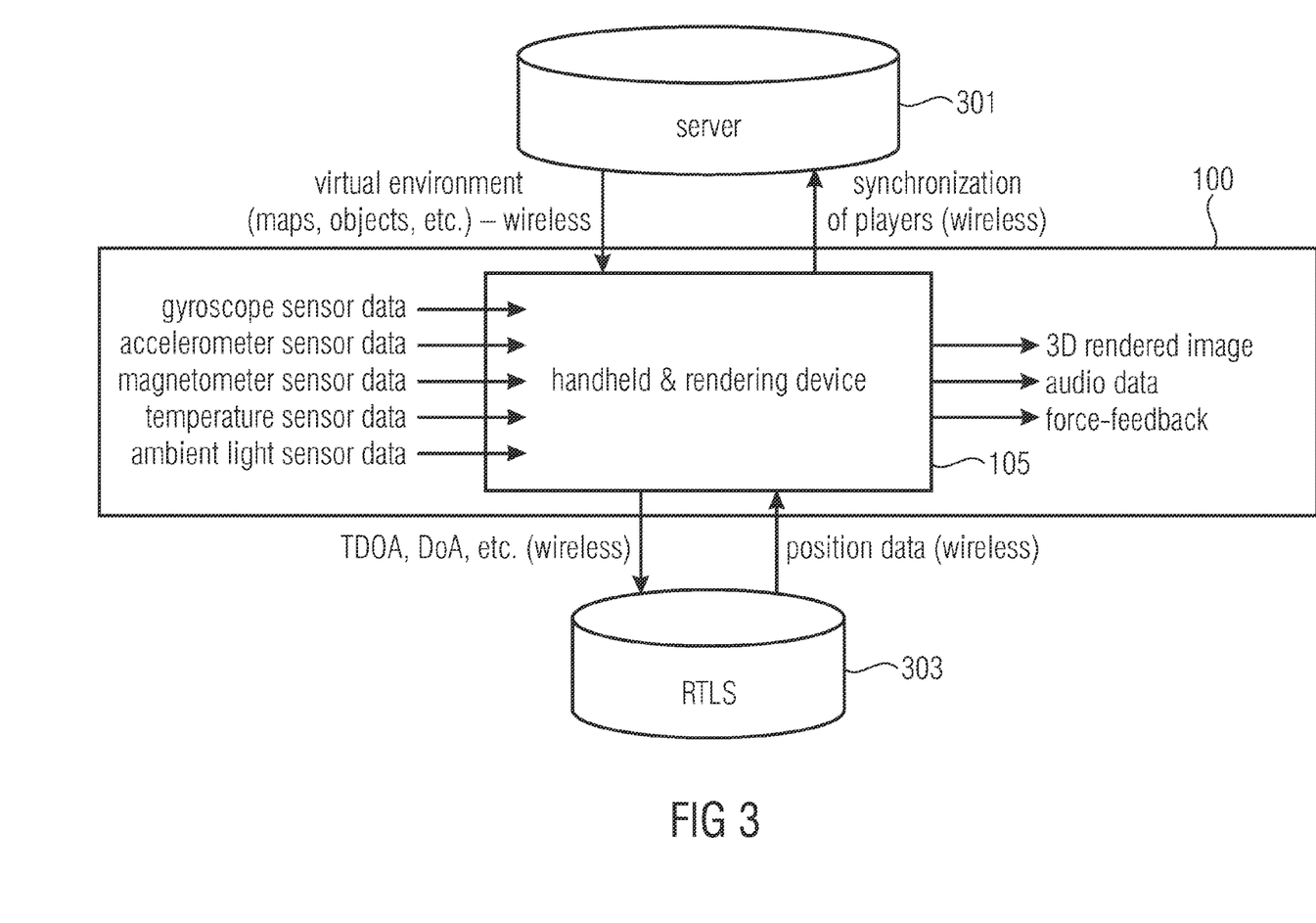
FIG. 3 shows a block diagram of a virtual reality system according to an embodiment of the systems and methods described herein.

FIG. 3 shows in a schematic illustration the different data signals and communication signals which may be received and generated by the processing unit 105 of the portable device 100. As can be seen from FIG. 3, the portable device 100 may be configured to communicate with a sever 301, for example in an external communication unit from which the portable device 100 receives details on the virtual environment (such as maps, objects, etc.) by means of a wireless communication.

Furthermore, the mobile device 100 may receive an information of the synchronization of different players or users acting in the real world. Hence, the portable device 100 may not only be configured to generate virtual objects in the virtual world but also display other users which act together with the user of the portable device 100 in the real world. Hence, the portable device 100 enables an interaction with other people in a localizable area just by having a portable device 100 at each user.

Furthermore, from FIG. 3 it can be seen that the portable device 100 may receive its position data 113 from an RTLS locating unit 303, e.g. integrated in the external communication device. In the example shown in FIG. 3 the position determiner 103 may be a communication interface through which the portable device 100 receives the position data from the RTLS locating unit 303.

FIG. 4 shows a block diagram of a virtual reality system 400 according to a further embodiment of the systems and methods described herein. The virtual reality system 400 comprises a portable device according to an embodiment of the systems and methods described herein. In the example shown in FIG. 4 the virtual reality system 400 comprises the portable device 100 shown in FIG. 1. Furthermore, the virtual reality system 400 comprises a terrestrial communication unit 401, which is arranged external to the portable device 100. For example, the terrestrial communication unit 401 may be arranged in a first housing and the portable device 100 may be arranged in the second housing, which is different from the first housing. While the portable device 100 is typically carried around by a user, the terrestrial communication unit 401 is arranged in a predetermined position from which it is typically not moved away (when the terrestrial communication unit is in use). The position determiner 103 of the portable device 100 is configured to determine the position 113 of the user in the real world based on a wireless communication signal 403 received from the terrestrial communication unit 401.

The term terrestrial means that no satellite, like a GPS satellite, is involved in determining the position 113 of the user of the portable device 100. As an example, the terrestrial communication unit 401 may be configured to determine the position of the portable device 100 by means of an RTLS algorithm.

Furthermore, the terrestrial communication unit 401 may be configured to survey a dedicated movement area to determine positions of a plurality of portable device 100 carried by a plurality of users and to transmit the positions of the plurality of portable devices 100 to the plurality of portable devices 100. Hence, according to some embodiments, the virtual reality system 400 may comprise a plurality of portable devices 100.

To summarize, embodiments of the systems and methods described herein provide a virtual reality approach in which a user takes a wireless devices or portable device 100 and interacts with other people in a localizable area (in the real world). Other virtual reality applications mostly do not provide such an interactive, realistic and easy to use framework. Additionally, locating people with such good accuracy has not been available for many people, so other approaches did not even care about such a feature.

The possible use cases are widespread. For instance, it could provide a realistic gaming application. Such games are any first person games. Also, supermarkets and stores can provide their virtual environment and people could walk as if they were really in this market. Another application would be a (live) broadcast of a concert or a TV show, where the user is not sitting in front of the TV but could really feel as if he would be at that location. A large variety of other applications are possible. Simplified, any application is possible where one can interact with other people and with items as himself.

Hence, embodiments of the systems and methods described herein provide a system for interactive real game playing by sensor fusion and real time rendering on handheld devices in collaboration with real time locating systems (RTLS) and motion sensors. Such a system is capable of the conveying the feeling at a user that he resides in a fully virtual environment. By using real time locating systems, multiple sensor data and rendering hardware, it is possible to simulate a temperature, weather and time independent virtual reality for a user, in which he can move freely and can interact. Furthermore, embodiments enable the implementation of more than one user in one instance of the system.

Embodiments of the systems and methods described herein enable a user to walk through the virtual world or virtual environment with his own legs, without pressing keys on a keyboard or aiming with a computer mouse.

Figure 5:
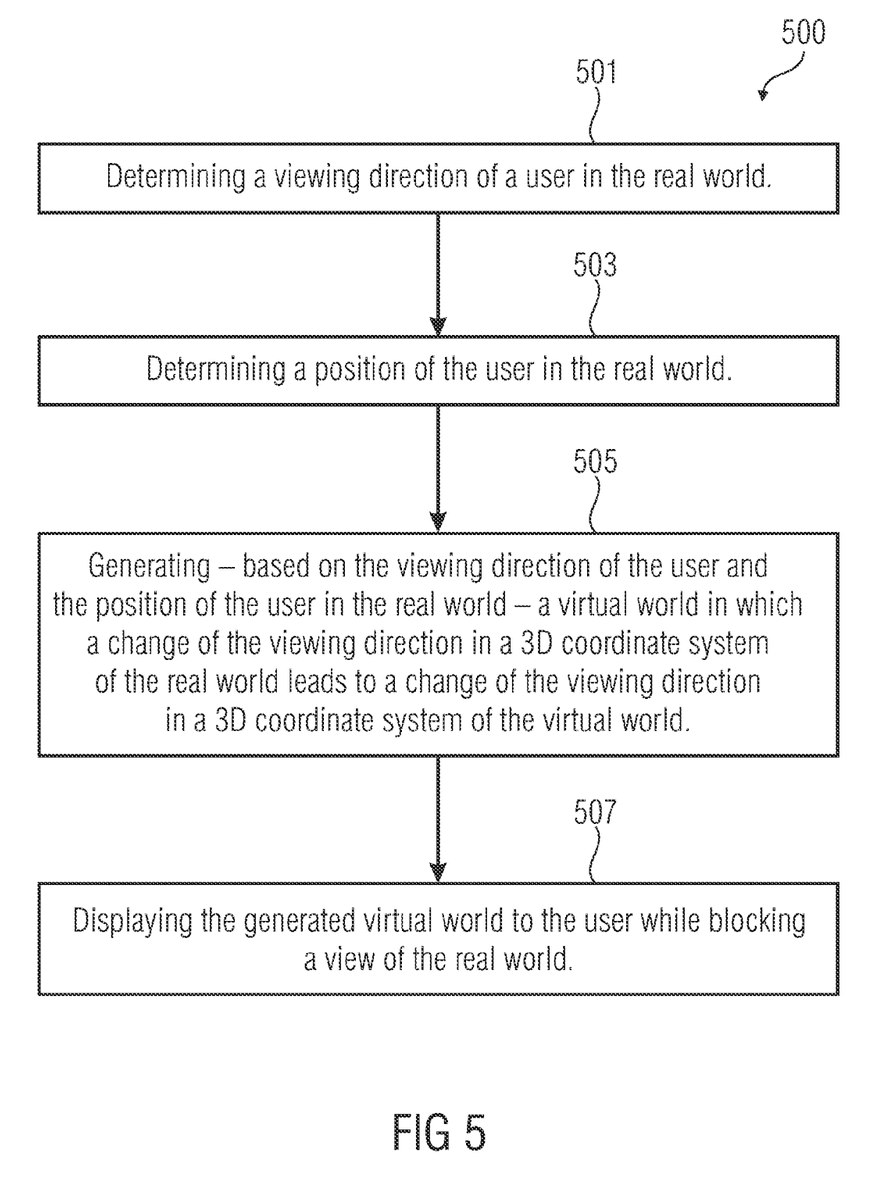
FIG. 5 shows a flow diagram of a method according to an embodiment of the systems and methods described herein.

FIG. 5 shows a flow diagram of a method 500 according to an embodiment of the systems and methods described herein.

The method 500 comprises a step 501 of determining a viewing direction of a user in the real world.

Furthermore, the method 500 comprises a step 503 of determining a position of the user in the real world.

Furthermore, the method 500 comprises step 505 of generating—based on the viewing direction of the user and the position of the user in the real world—a virtual world in which a change of the viewing direction in a 3D coordinate system of the real world leads to a change of the viewing direction in a 3D coordinate system of the virtual world.

Furthermore, the method 500 comprises a step 507 of displaying the generated virtual world to the user while blocking a view of the real world.

The method 500 may be performed by a portable device according to an embodiment of the systems and methods described herein, for example by the portable device 100 shown in FIG. 1.

The method 500 may be supplemented by any of the features and functionalities described herein with respect to the apparatus, and may be implemented using the hardware components of the apparatus.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the systems and methods described herein can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A portable device comprising:
a viewing direction sensor configured to determine the viewing direction of a user of the portable device in the real world;
a position determiner configured to determine a position of the user in the real world;
a processing unit configured to generate—based on the viewing direction of the user and the position of the user in the real world—a virtual world in which a change of the viewing direction in a 3D coordinate system of the real world leads to a change of the viewing direction in a 3D coordinate system of the virtual world; and
a display configured to display the generated virtual world to the user while blocking a view of the real world;
wherein the processing unit is configured to generate virtual objects in the virtual world at positions in the 3D coordinate system of the virtual world;
wherein the processing unit is configured to change a level of detail or a size of the virtual objects in response to a change of a precision of the determined position of the user in the real world; and
wherein the processing unit is configured to choose the level of detail or the size of the virtual objects in dependence on the precision of a currently used locating algorithm for determining the position of the user.

2. The portable device according to claim 1,
wherein the processing unit is configured to, upon on a decrease of the precision of the determined position of the user in the real world, increase a size of the virtual objects or decrease a level of detail of the virtual objects.

3. The portable device according to claim 1,
wherein the processing unit is configured to, upon on an increase of the precision of the determined position of the user in the real world, decrease a size of the virtual objects or increase a level of detail of the virtual objects.

4. The portable device according to claim 1,
wherein the processing unit is further configured to generate the virtual world such that a change of the position of the user in the 3D coordinate system of the real world leads to a change of the position of the user in the 3D coordinate system of the virtual world.

5. The portable device according to claim 1, further comprising:
an environmental condition sensor configured to determine an environmental condition in the real world; and
wherein the processing unit is further configured to generate the virtual world based on the determined environmental condition such that a change of the environmental condition in the real world leads to a change in the generated virtual world.

6. The portable device according to claim 5,
wherein the determined environmental condition is a temperature or air humidity or wherein the environmental condition sensor is a light sensor.

7. The portable device according to claim 5,
wherein the determined environmental condition is not viewable for a user in the real world; and
wherein the processing unit is configured to graphically visualize the determined environmental condition in the generated virtual world.

8. The portable device according to claim 1,
wherein the processing unit is configured to generate virtual objects in the virtual world at positions in the 3D coordinate system of the virtual world which correspond to positions in the 3D coordinate system of the real world at which real objects in the real world are located.

9. The portable device according to claim 8,
wherein the processing unit is configured to replace the real objects in the real world with the virtual objects in the virtual world, such that a virtual object in the virtual world which replaces a real object in the real world leads to a similar user behavior as the real object.

10. The portable device according to claim 8,
wherein the processing unit comprises an object database in which the real objects and their locations in the real world are stored or the processing unit is configured to receive an object information about the real objects and their locations in the real world; and
wherein the processing unit is configured to generate the virtual objects based on the object database or the received object information.

11. The portable device according to claim 1,
wherein the position determiner is a real time locating system unit configured to determine the position of the user in the real world based on a terrestrial locating algorithm.

12. The portable device according to claim 1,
further comprising an electronic tag which is localizable by an external communication unit; and
wherein the position determiner is configured to determine the position of the user in the real world based on a communication signal received from the external communication unit.

13. The portable device according to claim 12,
wherein a functionality of the electronic tag is independent from a functionality of the position determiner.

14. The portable device according to claim 1,
wherein the portable device is a game controller; and
wherein the processing unit is configured to generate the virtual world in accordance with a game the user plays, such that a way the processing unit generates the virtual world is different for different games the user plays or for different game situations of the game the user plays, while the real world in which the user acts stays the same.

15. The portable device according to claim 1,
wherein the processing unit is configured to generate—based on an object database—the virtual world as a virtual reproduction of the real world in which the user acts.

16. A virtual reality system comprising:
a portable device, the portable device comprising:
   a viewing direction sensor configured to determine the viewing direction of a user of the portable device in the real world;
   a position determiner configured to determine a position of the user in the real world;
   a processing unit configured to generate—based on the viewing direction of the user and the position of the user in the real world—a virtual world in which a change of the viewing direction in a 3D coordinate system of the real world leads to a change of the viewing direction in a 3D coordinate system of the virtual world; and
   a display configured to display the generated virtual world to the user while blocking a view of the real world;
   wherein the processing unit is configured to generate virtual objects in the virtual world at positions in the 3D coordinate system of the virtual world;
   wherein the processing unit is configured to change a level of detail or a size of the virtual objects in response to a change of a precision of the determined position of the user in the real world; and
   wherein the processing unit is configured to choose the level of detail or the size of the virtual objects in dependence on the precision of a currently used locating algorithm for determining the position of the user; and
a terrestrial communication unit, which is arranged external to the portable device; and
wherein the position determiner of the portable device is configured to determine the position of the user in the real world based on a wireless communication signal received from the terrestrial communication unit.

17. A method comprising:
determining a viewing direction of a user in the real world;
determining a position of the user in the real world;
generating—based on the viewing direction of the user and the position of the user in the real world—a virtual world in which a change of the viewing direction in a 3D coordinate system of the real world leads to a change of the viewing direction in a 3D coordinate system of the virtual world; and
displaying the generated virtual world to the user while blocking a view of the real world;
generating virtual objects in the virtual world at positions in the 3D coordinate system of the virtual world; and
changing a level of detail or a size of the virtual objects in response to a change of a precision of the determined position of the user in the real world,
wherein the level of detail or the size of the virtual objects is chosen in dependence on the precision of a currently used locating algorithm for determining the position of the user.

18. Non transitory storage medium having stored thereon a computer program comprising a program code for performing, when running on a computer, a method comprising:
determining a viewing direction of a user in the real world;
determining a position of the user in the real world;
generating—based on the viewing direction of the user and the position of the user in the real world—a virtual world in which a change of the viewing direction in a 3D coordinate system of the real world leads to a change of the viewing direction in a 3D coordinate system of the virtual world; and
displaying the generated virtual world to the user while blocking a view of the real world;
generating virtual objects in the virtual world at positions in the 3D coordinate system of the virtual world; and
changing a level of detail or a size of the virtual objects in response to a change of a precision of the determined position of the user in the real world,
wherein the level of detail or the size of the virtual objects is chosen in dependence on the precision of a currently used locating algorithm for determining the position of the user.

* * * * *

UNITED STATES PATENT AND TRADEMARK OFFICE
CERTIFICATE OF CORRECTION

PATENT NO. : 9,216,347 B2  
APPLICATION NO. : 14/245790  
DATED : December 22, 2015  
INVENTOR(S) : Mutschler et al.

Page 1 of 1

It is certified that error appears in the above-identified patent and that said Letters Patent is hereby corrected as shown below:

Title page, item (73) Assignee, "FRAUNHOFER-GESELLSCHAFT ZUR FOERDERUNG DER ANDEWANDTEN FORSCHUNG E.V." should be changed to -- FRAUNHOFER-GESELLSCHAFT ZUR FOERDERUNG DER ANGEWANDTEN FORSCHUNG E.V. --

Signed and Sealed this  
Fifth Day of July, 2016

Michelle K. Lee  
*Director of the United States Patent and Trademark Office*